June 9, 1964 P. C. WILMARTH 3,136,849
TELEVISION RECEIVER
Filed March 14, 1961
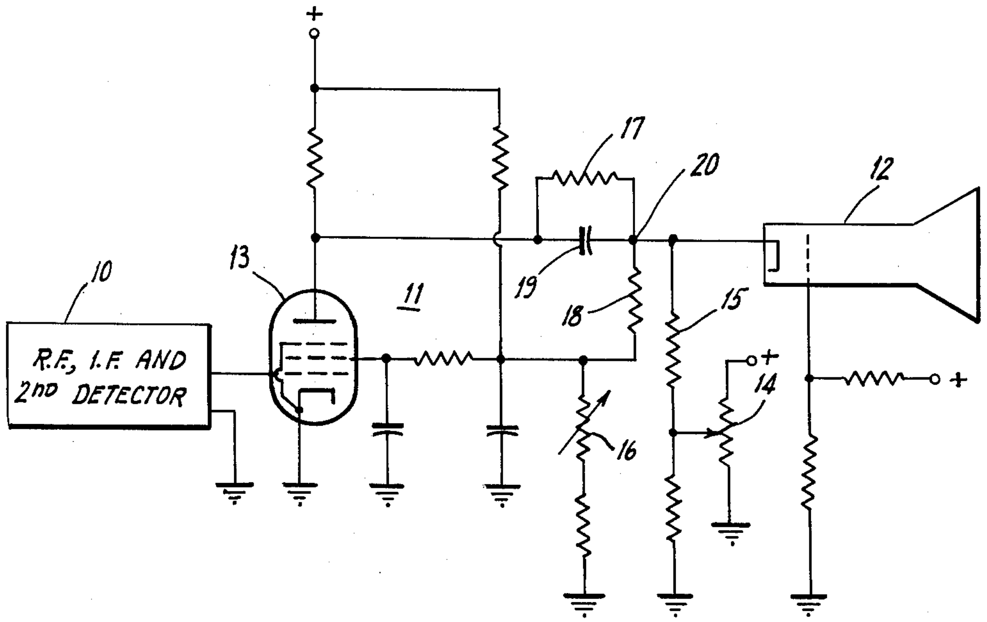
INVENTOR.
PAUL C. WILMARTH
BY Fordyce A. Bothwell
ATTORNEY

United States Patent Office 3,136,849

Patented June 9, 1964

3,136,849

TELEVISION RECEIVER

Paul C. Wilmarth, Warminster, Pa., assignor, by mesne assignments, to Philco Corporation, Philadelphia, Pa., a corporation of Delaware Filed Mar. 14, 1961, Ser. No. 95,570
1 Claim. (Cl. 178—7.5)

This invention relates to television receivers and more particularly to that portion of such a receiver extending between the second detector and the image-producing cathode ray tube.

To achieve optimum reproduction of a televised object or scene, it is desirable to provide a certain amount of direct-current coupling between the second detector and the cathode ray tube. However when direct-current coupling is employed, adjustment of the contrast control tends to change the brightness level and necessitates readjustment of the brightness control, which of course is undesirable. The reason for this is that the contrast control varies the plate current, and consequently the plate voltage, of the video output stage, and with direct-current coupling to the cathode ray tube the change in D.C. voltage changes the brightness level in the cathode ray tube. Furthermore it is generally not desirable to provide full direct-current coupling.

For these reasons it has been customary in the past to employ alternating-current coupling and direct-current restoration. However while this effectively isolates the contrast control from the cathode ray tube, it does not provide a satisfactory solution of the problem.

One object of the present invention is to enable the desired use of direct-current coupling without causing objectionable variation of the brightness level with change of contrast adjustment.

Another object of the invention is to provide a simple and inexpensive arrangement for the achievement of the desired purpose.

Other objects and features of the invention will be apparent as the description proceeds.

In accordance with this invention, the contrast control is connected to the screen grid of the video output stage so that when the contrast adjustment is changed, the screen grid and plate voltages change in opposite directions, and an arrangement is provided by which the voltage changes are caused to oppose one another.

The invention may be fully understood from the following detailed description with reference to the accompanying drawing wherein the single figure is a diagrammatic partial illustration of a television receiver embodying a preferred form of the invention.

Referring more particularly to the drawing, block 10 represents the conventional RF, IF and second detector stages of a television receiver. The detected video signal is supplied to the video amplifier which includes at least one stage 11 which is coupled to the conventional image-producing cathode ray tube 12. While a single video amplifier stage is shown, it will be understood that more than one such stage may be employed. In any case, the illustrated stage 11 represents the video output stage.

The video signal is supplied to the control grid of tube 13, the cathode of which is connected to ground. Except for the arrangement presently to be described, the video output stage is conventional and it supplies the video signal to the cathode ray tube. The brightness level is adjusted by means of a brightness control represented at 14. As illustrated the brightness control is connected to the cathode of the cathode ray tube through a resistor 15.

In accordance with this invention, the contrast control 16 is connected to the screen grid of tube 13 so as to vary the screen grid voltage, and direct-current coupling to the cathode ray tube is provided through resistors 17 and 18. Resistor 17 is connected in shunt with the coupling capacitor 19. Resistor 18 is connected between the screen grid circuit and the output side of resistor 17 and capacitor 19.

With this arrangement, adjustment of the contrast control causes the voltages at the screen grid and plate of tube 13 to change in opposite directions, and the voltage changes are caused to oppose one another. Thus if the resistance of the contrast control 16 is decreased, the screen grid voltage is lowered and the plate current is decreased with consequent increase of the plate voltage. By choice of values of resistors 17 and 18, the D.C. voltage at point 20 can be caused to remain substantially constant or it can be caused to change in a predetermined manner if it is desired to cause some change of brightness with different contrast control adjustments.

The choice of values of resistors 17 and 18 also determines the percentage of direct-current coupling to the cathode ray tube. Since the screen grid and plate voltages of tube 13 will change about equally and in the same direction with changes of potential of the control grid, the percentage of direct-current coupling is represented approximately by the voltage division effected by resistors 17 and 18 in parallel and resistor 15. For example, if the resistances of resistors 17 and 18 are 100 kilohms and 150 kilohms respectively, their parallel resistance is 60 kilohms. If the resistance of resistor 15 is 150 kilohms, the approximate percentage of direct-current coupling is $$\frac{150}{150+60}=.715 \text{ or } 71.5\%$$

It will be apparent that the contrast control can be connected to the screen grid of tube 13 in ways other than that shown. Any arrangement which varies the screen grid voltage is suitable for the purpose of this invention.

From the foregoing it will be seen that this invention provides a very simple arrangement which merely requires connection of the contrast control to the screen grid of the video output stage and the addition of resistors 17 and 18 connected as shown.

While the invention has been illustrated and described with reference to a single preferred embodiment, it will be understood that the invention is not limited thereto but contemplates such modifications and other embodiments as may occur to those skilled in the art.

I claim:

In a television receiver, a video output stage including an electron tube having a screen grid and an anode, variable resistance means connected between said screen grid and ground for controlling contrast, an image-producing cathode ray tube having an input electrode, a first resistor serially connected between said anode and said input electrode, a second resistor connected between the ungrounded end of said variable resistance means and the output end of said first resistor, a third resistor having one end connected to said input electrode, and brightness control means connected to the other end of said third resistor, the percentage of direct-current coupling between said output stage and said cathode ray tube being determined approximately by the voltage division effected by said first and second resistors in parallel and said third resistor.

References Cited in the file of this patent

UNITED STATES PATENTS

| | | |
|---|---|---|
| 2,743,313 | Schwarz | Apr. 24, 1956 |
| 2,927,156 | Jones | Mar. 1, 1960 |
| 3,037,565 | Forster | June 5, 1962 |